July 18, 1944.  J. P. SEAHOLM  2,353,790
SCRAPER MECHANISM
Filed April 24, 1942   3 Sheets-Sheet 1
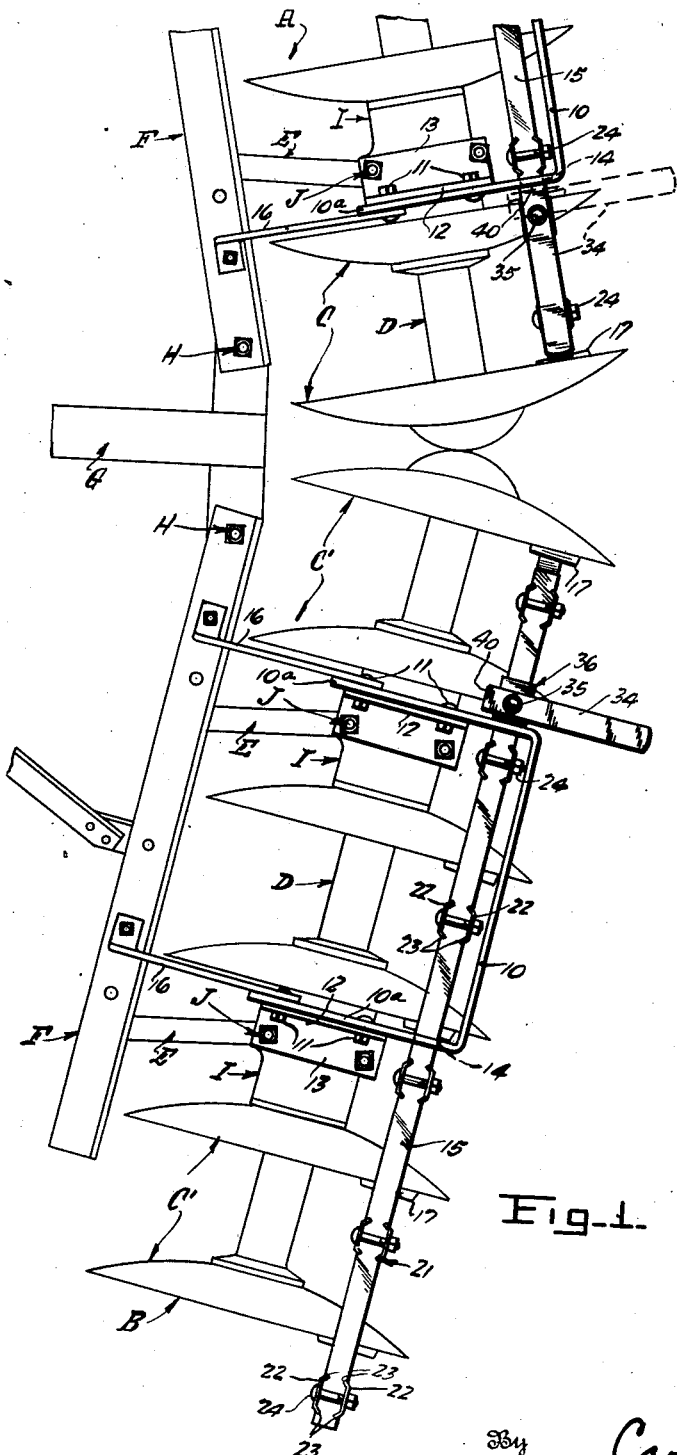
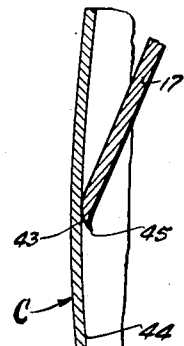
Fig. 2.
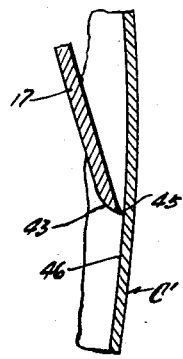
Fig. 3.
Fig. 1.
Inventor
JOHN P. SEAHOLM
By Carlsen & Hagle
Attorneys July 18, 1944.   J. P. SEAHOLM   2,353,790
SCRAPER MECHANISM
Filed April 24, 1942   3 Sheets-Sheet 2

Inventor
JOHN P. SEAHOLM
By Carlsen & Hazle
Attorneys

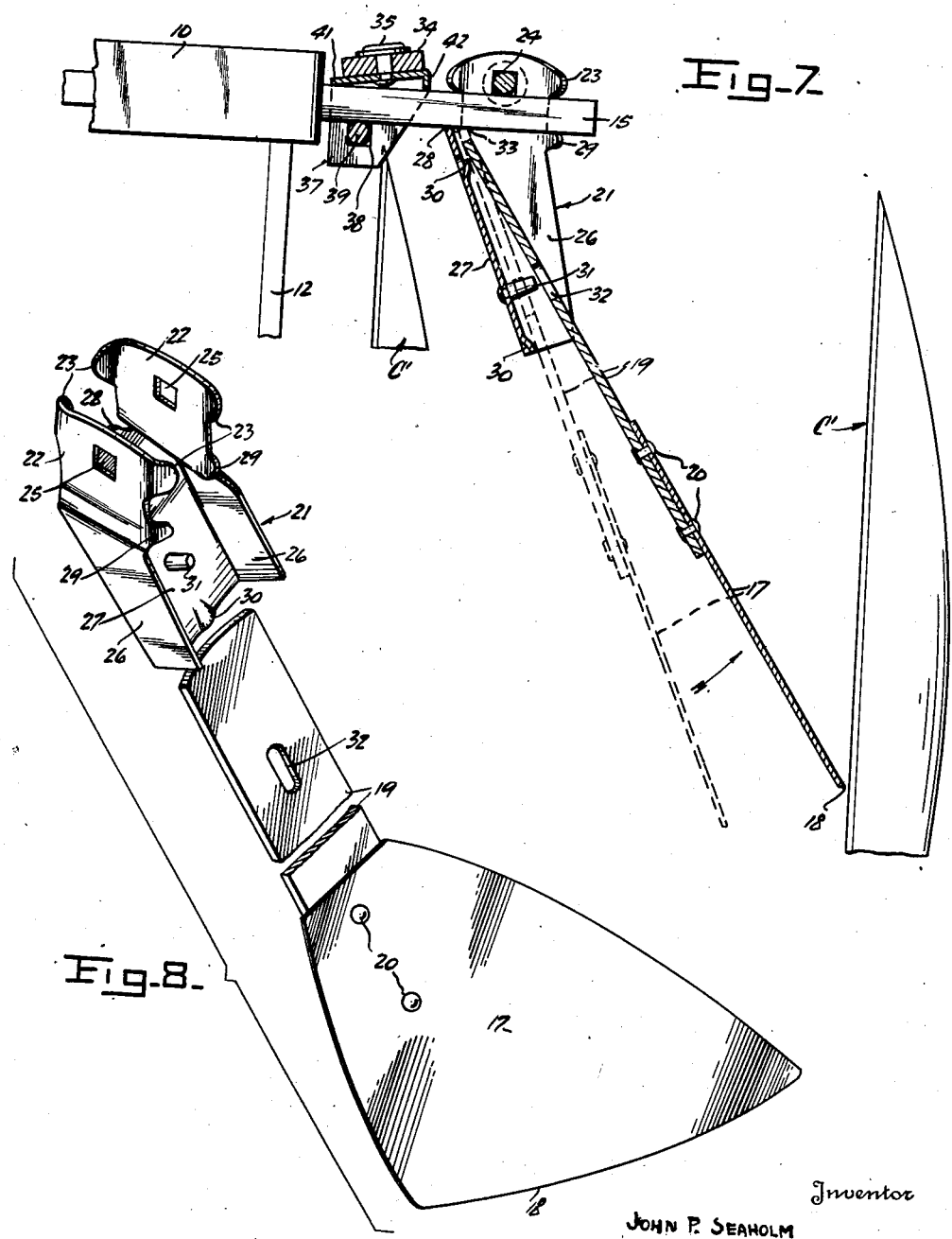

Patented July 18, 1944

2,353,790

UNITED STATES PATENT OFFICE 2,353,790

SCRAPER MECHANISM

John P. Seaholm, Moline, Ill., assignor to Minneapolis-Moline Power Implement Company, Minneapolis, Minn., a corporation of Delaware Application April 24, 1942, Serial No. 440,321

15 Claims. (Cl. 97—224)

This invention relates to improvements in scraper mechanisms for disk harrows and similar ground working implements.

Scrapers are used in such implements to keep the concave or working sides of the disks free from the soil which has a tendency to cling to the disks under certain conditions. Unless such soil is cleared away it will accumulate and injure the working effect of the disks as is well known. These scrapers usually are in the form of comparatively thin blades supported by standards or shanks from a scraper bar which is slidably mounted in a lengthwise direction on each disk gang. By moving the bar in one direction the scraper blades are brought to bear with some pressure upon the working faces of the disks and by reversing the movement of the bar the blades may be moved clear or substantially clear of the disks when their use is not required, the scrapers being thus adjustable collectively for each gang.

The pressure of the scraper blades against the disks causes rather rapid wear on their working edges and the nature of this wear is such as to cause the edges to assume what is known as a "sled runner" shape in which the edges turn outward from the face of the disk at an angle permitting soil and trash to work between scrapers and disks. Thus not only is the scraping and cleaning effect largely lost by such wear but the working of material between scrapers and disks pushes upon the scrapers causing an increase in pressure which may become so great as to completely stop the disks from rotating.

In the effort to avoid this action various means have been provided for reversing the scrapers. That is, the scrapers of one gang have been removed and placed in use on the other, oppositely reacting gang. In so doing the scrapers are reversed in such manner that the previously out turned worn edge is placed next to the working face of the disks so that it will again have a scraping action. This operation may be repeated a number of times before the scrapers are finally discarded and replaced with new ones, and a considerable saving will obviously result.

However, previous reversible scraper mechanisms with which I am familiar have had a number of shortcomings chief of which is the time and labor required to make the change from one gang to the other. Where the scrapers must be removed by the laborious removal and replacement of nuts, cotters or similar fasteners it is obvious that the normal human tendency toward procrastination will cause the job to be put off until the scrapers are often too badly worn to justify anything but complete replacement. Then too, the scrapers must be adjustable collectively, or as a unit for each gang, from working positions to idle positions clearing the disks and any quick removable scraper mounting which will permit the possible dislodgement of the scrapers in any of these positions is useless.

Having in mind the foregoing facts it is the primary object of my invention to provide a scraper mechanism or assembly in which the necessary reversal of the scrapers may be made easily and quickly without the removal of any nuts, cotters or other devices. Another object is to provide mechanism of this kind in which the scraper mounting, while permitting convenient removal and replacement of the scrapers in the reversing process, is nevertheless such as to positively prevent accidental dislodgement of the scrapers in either their working or idle positions. Another object is to provide a scraper mounting in which the scrapers for each gang are adjustable as a unit and which is of simple, durable and inexpensive construction.

These and other more detailed and specific objects will be disclosed in the course of the following specification, reference being had to the accompanying drawings, in which—

Fig. 1 is a fragmentary plan view of a disk harrow equipped with scraper mechanism of my invention.

Figs. 2 and 3 are sectional views of a portion of a disk and scraper blade illustrating the manner in which the worn blade may be restored to a working condition simply by reversing it and changing it to an oppositely reacting disk.

Fig. 7 is a greatly enlarged fragmentary sectional view through one scraper and associated parts showing the manner in which the scraper may be removed.

Fig. 8 is a perspective view of the scraper mounting assembly alone, and showing the parts disassembled.

Figure 4:
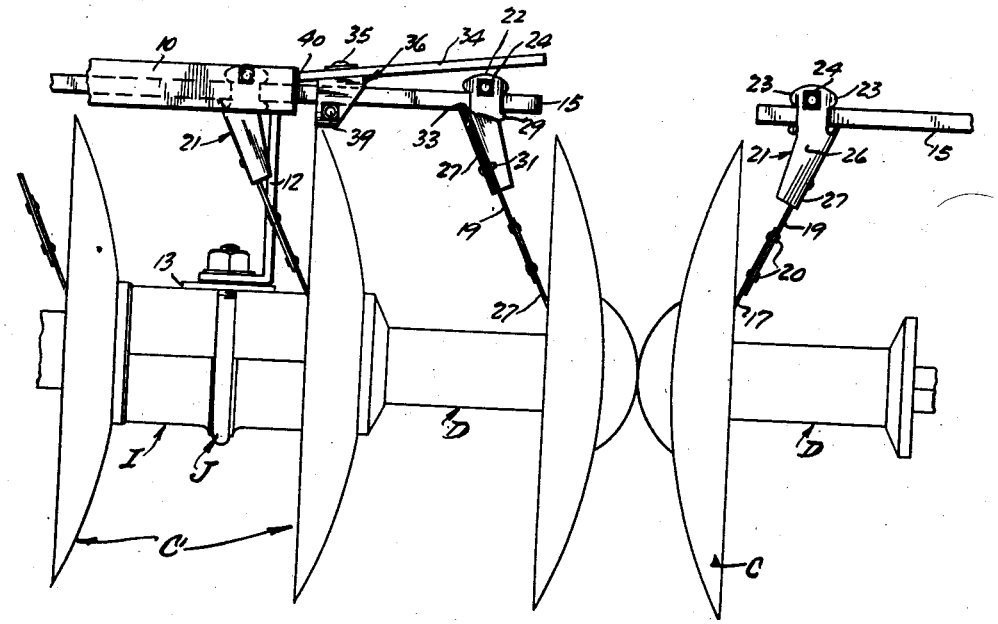
Fig. 4 is an enlarged fragmentary rear elevation of the harrow showing the scrapers in the working or scraping positions.
Figure 5:
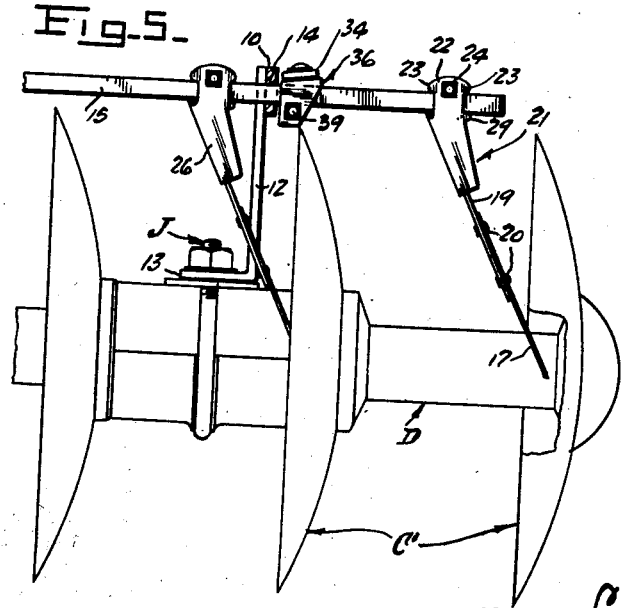
Fig. 5 is a similar view but showing the scrapers moved to their inoperative positions.

My invention is shown in the drawings as assembled upon a disk harrow of well known form having oppositely reacting disk gangs A and B made up respectively of disks C and C' which are arranged upon gang assemblies D and connected by drag links E to forwardly arranged draft or frame bars F. Said bars F are connected to a tongue G by pivots H and may be angled forwardly or rearwardly in usual manner in order to vary the working angle of the disk gangs. Bearings I are secured by bolts J to the disk gang assemblies D and drag links E. The disks C—C' are oppositely dished or concaved so that their concaved working faces are outwardly disposed on each gang. My invention is not, however, limited to use on disk harrows of this particular type but may be used as well on so-called double cut harrows, disk plows and other similar soil working implements.

The scraper mechanism for each gang A and B comprises a U-shaped scraper bar support 10 having its legs 10a turned forwardly above the disks and secured by bolts 11 atop standards 12 which have flanged lower ends 13 by which they are secured upon upper ends of the bearing fastening bolts J. Near their rear ends the legs 10a have slots 14 through which is slidably mounted an elongated scraper bar or scraper mounting bar 15. This bar is thus supported above and toward the rear of the disk gang and may be moved endwise in a plane parallel with the axis of the gang. Braces 16 are extended between the forward ends of the support legs 10a and the draft bars F as seen in Fig. 1.

The scraper blades 17 are made of comparatively thin flat material having curved scraping or working edges 18 and the blades are secured to flat, elongated spring like shanks or arms 19 by rivets 20. The upper end of each shank 19 is received and supported by a hanger, carrier or fastener device designated generally at 21. This device 21 is a metal stamping formed from a suitably shaped blank to provide upwardly extending spaced ends 22 (see Fig. 8) adapted to engage opposite front and rear edges of the scraper bar 15 and with ears or lugs 23 turned angularly from upper corners to overlie the bar. A bolt 24 is passed through apertures 25 in the ends 22 above the bar and, when tightened, clamps said ends upon the bar causing all of the carrier devices to move as a unit therewith. Below the bar the ends 22 of the hangers or carriers are extended in the form of sides 26 disposed at the margins of a mounting plate 27 the upper end 28 of which bears against the underside of the bar. Other ears or lugs 29 formed on and turned from the sides 26 also engage the underside of the bar and the four point engagement of the ears 23 and 29 and end 28 will absolutely prevent any rocking movements of the hangers on the scraper bar as will be evident.

The plate 27 and the sides 26 turned from the margins thereof form a trough-like structure opening downwardly and toward the concaved working side of the adjacent disk, outward of which said device is mounted. The upper end of each scraper shank or arm 19 may thus be inserted between the sides 26 to rest upon the plate 27, actual contact over the entire surface of the plate being prevented by small bosses or teeth 30 punched from the plate adjacent its upper and lower ends to engage the shank. Intermediate these ends the plate carries a pin 31 upon which the shank 19 may be supported, said shank having a slot 32 to receive the pin. The plate 27 is angled from the vertical downwardly and inwardly toward its lower end so that the scraper blade 17 will meet the working side of its disk at the proper angle when the shank is engaged in the bracket.

Attention is called to the fact that, when the scraper blade is engaged with the disk, the upward thrust on the blade, caused by rotation of the disk and the scraping action, will cause the engagement of the upper end of the shank with the underside of the scraper bar 15 as represented at 33. The shank actually has a somewhat wedging effect between the upper boss 30 and the bar, as evident in Fig. 7.

In assembling the scraping mechanism for each gang the bars 15 are placed in the supports 10 and upon each bar a number, equal to that of the disks of the gang, of the hanger devices 21 are secured in positions outwardly of the disks. The scraper blades then have their shanks engaged in the hanger or fastening devices and obviously the movement of the bar 15 inwardly will then carry the blades collectively into engagement with their respective disks. The necessary yielding pressure between the blades and disks may be provided by the resiliency of the shanks 19.

Figure 6:
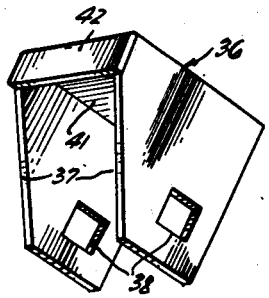
Fig. 6 is an enlarged perspective view of the bracket or clamp used in connecting the adjusting lever to the scraper bar.

To adjust the scraper bars I provide for each a hand lever 34 which is pivoted by a rivet 35 to a clamp or bracket 36 formed of a U-shaped metal stamping having ends 37 adapted to straddle the bar 15. These ends are apertured as at 38 (Fig. 6) to receive a bolt 39 which passes beneath the bar to clamp the ends thereon. This clamp 36 is secured to the bar inwardly of the innermost leg 10a of the scraper support 10 and when the lever 34 is swung inwardly to a position parallel with the bar (gang A, Fig. 1) its end 40 will engage said support to urge the bar inwardly lengthwise of the gang and so bring the scrapers to bear on outer sides of the disks. When the lever is swung outwardly and rearwardly (gang B, Fig. 1), on the other hand, the lever end 40 will clear the support 10 thus allowing the bar 15 to move outwardly to a point sufficient to relieve the scrapers of pressure engagement with the disks, this being the idle or neutral position of the scrapers.

It will be noted that the top 41 of the clamp 36 formed by the bight of the U-shaped stamping is angled upwardly toward its inner end, having a marginal flange or lip 42 turned downwardly from this end for the purpose of engaging the bar. Not only does this provide space beneath the bracket top 41 for the head of the rivet 35, eliminating countersinking thereof, but it also causes the hand lever 34 to angle upwardly in the working position of the parts (Fig. 4) facilitating manipulation of the lever and causing it to clear the innermost bracket device 21.

The shanks 19 are somewhat narrower than the space between the sides 26 of the hanger devices 21 into which they fit and the shanks may oscillate about the pins 31 as an axis or twist about their line of contact with the bosses 30 to permit the scraper blades to conform themselves to the disks against which they scrape.

As the scraper blades work, their edges 18 are of course subject to rather rapid wear and it is found that after a comparatively short period of use the blade edges will assume a shape such as shown in Fig. 2. That is, the edges take on what may be termed a "sled runner" shape with the surface 43 next to the disk side 44 worn away at an angle such that an opening is formed into which soil or trash may wedge itself between blade and disk. The edge of the blade as it is worn very thin by this action will have a tendency to curl away from the disk, as at 45, to further encourage the entrance of matter between disk and blade. As a result not only is the scraping effect of the blade largely lost, but also trash may in time wedge between blade and disk to actually stop rotation of the gang. However, if the same scraper blade is placed upon an oppositely reacting disk, that is, if it is removed from one gang and placed on the opposite gang, the blade may be reversed placing what was previously its outer side inward toward the disk. There the sharp worn edge 45 of the blade is placed next to the working surface 46 of the oppositely reacting disk as in Fig. 3 and a scraping action will be had until the blade is again worn. The blade may then be reversed again, or restored to its original place, and this operation may be repeated until the blade is finally replaced with a new one.

In my invention this reversal of the scraper blades may be accomplished by simply loosening the bolt 39 mounting the lever clamp 36 on the scraper bar and then shifting the bar by hand in an outward direction as far as possible, as in Fig. 7. In so doing the scrapers are moved away from their respective disks to such distance that they may be swung upwardly at their lower ends toward the disks until the slots 32 clear the pins 31. The length of the slots permits this operation with the shanks 19 pivoting about their engagement with the upper boss 30. When thus disengaged the shanks and attached scraper blades may be dropped clear and then turned side for side and placed upon the other gang, being hung upon the pins 31 until the scraper bars 15 are again moved inward to their normal position and the clamp 36 rebolted ready for operation. This operation is thus seen to be carried out without any use of tools except for loosening the bolts 39 and without removing any small fastening parts such as nuts or cotters which might be readily lost. Also the operation is very rapid and convenient, as will be apparent.

From the foregoing it will be noted that the scrapers are held against dislodgement from the hangers 21 in either their working or idle positions by virtue of the fact that the disks will prevent the blades and shanks from being swung in the only direction which will cause their release. Then when it is desired to remove the blades they are moved in the same direction beyond their idle positions until sufficient clearance is provided to permit them to be swung clear of the pins 31. Even in such position the scrapers will not fall clear until actually removed by hand and in no case can they be dislodged in either working or idle positions.

Obviously when the gangs are disposed for throwing the soil inward instead of outward (as in double cut harrows) the position of some parts and the direction of some movements as herein described will be reversed. Nevertheless the same convenient group or collective operation of the scrapers and easy reversal to compensate for wear will obtain as will be understood.

The clamps 36 may be readily adjusted along the scraper bars 15 to compensate for wear on the scrapers whereas individual adjustments of the hangers 21 will permit fine tensioning adjustments for each blade.

It is understood that suitable modifications may be made in the structure as disclosed, provided such modifications come within the spirit and scope of the appended claims. Having now therefore fully illustrated and described my invention, what I claim to be new and desire to protect by Letters Patent is:

1. In a disk harrow gang structure having a series of disks, a scraper bar supported for movement lengthwise of the gang, scraper mounting members on the bar, scrapers supported from the members for scraping engagement with the disks and movable collectively by adjustment of the said bar from working relation with the disks to idle positions away from the disks, said scrapers and members having cooperating means releasably supporting the scrapers so that they may be disconnected from the members by swinging movements toward their respective disks and so that the disks will limit such movement in both working and idle positions of the scrapers to prevent disconnection thereof, said releasable supporting means including contacting parts operative to prevent displacement of the scrapers in the direction of disk rotation, a clamp member mounted on the bar and operative to normally limit movement of the scrapers away from the disks beyond their idle positions, and said clamp member including a bolt for frictionally clamping it on the bar and adapted to be loosened to free the clamp member and allow the scrapers to be moved away from the disks beyond said idle positions whereby space will be provided for swinging the scrapers clear of the mounting members.

2. Scraper mechanism for a disk harrow gang, comprising a scraper support, a scraper bar slidably mounted for movement lengthwise of the gang, scraper blades, a mounting member supporting the scraper blades from the bar for movement therewith as a unit from working engagement with the disks to idle positions away from the disks, a lever for adjusting the bar lengthwise to move the scraper blades, a bracket member supporting the lever on the bar, the scraper mounting member and bracket member having side portions embracing the scraper bar, and bolts extending through said side portions for clamping them on the scraper bar whereby said members may be individually adjusted thereon to adjust the blades to the disks and compensate for wear on the blades.

3. Scraping mechanism for a disk harrow, comprising a scraper for each disk, a scraper bar, a hanger member for supporting the scraper, said scraper including a shank, and the said hanger member including a mounting plate having means for engaging the shank along the longitudinal axis thereof with freedom for limited oscillating movements of the scraper and shank to accommodate the scraping edge of the scraper to the curvature of the disk, said shank having wedging engagement with the bar during said oscillating movements.

4. Scraping mechanism for a disk harrow, comprising a scraper blade for each disk, a shank extending upwardly from the blade, a movable scraper bar, a hanger member for connecting the shank and bar to support the blade in scraping or disengaged position with respect to the disk, said hanger member having a depending mounting plate against which the shank is adapted to rest, a pin on one face of the plate, the shank having an opening to receive the pin and suspend the shank and blade therefrom, and the upper end of the shank being arranged to bear at an angle against the underside of the scraper bar to resist displacement of the blade.

5. Scraper mechanism for a disk harrow gang, comprising a scraper support, a scraper bar slidably mounted for movement lengthwise of the gang, scraper blades, means supporting the scraper blades from the bar for movement therewith as a unit from working engagement with the disks to idle positions away from the disks, a lever arranged for camming engagement with the scraper support for adjusting the scraper bar endwise, a U-shaped clamp member having its legs arranged astraddle the bar and mounted for lengthwise adjustment therealong, and said member having an upper portion pivotally supporting the lever, and said upper portion of the clamp member being inclined upwardly at one end with respect to the upper surface of the bar to dispose the lever at a corresponding angle.

6. A scraping mechanism for a harrow disk, comprising a scraper, a supporting mechanism including a member engaging the upper end portion of the scraper to hold the latter in operative position and movable to carry the lower edge of the scraper toward the disk into scraping engagement therewith or away from the disk into an idle position clearing the disk, the said upper end portion of the scraper and said member having parts supportably and disengageably engaging each other, said parts being disengageable in response to movement of the scraper toward the disk and such movement being restricted by the disk in working and idle positions of the scraper to thereby prevent such disengagement, the said member being also movable away from the disk beyond the idle position to permit disengagement of the scraper, and means limiting movement of the scraper with respect to the member in a direction away from the disk.

7. A scraping mechanism for a harrow disk, comprising a scraper, a supporting mechanism including a member engaging the upper end portion of the scraper to hold the latter in operative position and movable to carry the lower edge of the scraper toward the disk into scraping engagement therewith or away from the disk into an idle position clearing the disk, the said upper end portion of the scraper and said member having parts supportably and disengageably engaging each other, said parts being disengageable in response to movement of the scraper toward the disk and such movement being restricted by the disk in working and idle positions of the scraper to thereby prevent such disengagement, the said member being also movable away from the disk beyond the idle position to permit disengagement of the scraper, and means forming a part of said supporting mechanism for engaging the upper end portion of the scraper and restraining the scraper against movement relative to the member away from the disk.

8. An implement scraper mounting of the character described, comprising a scraper bar, a supporting member thereon, a scraper arranged in a suspended position on the member and having a shank portion at its upper end, cooperating means on the member and said shank portion supportably and releasably engaging the latter below its upper end so that the scraper may be detached from the member by swinging movement in one direction, and the upper end of the said shank portion engaging the scraper bar to prevent swinging movement of the scraper in the opposite direction.

9. Scraping mechanism for a disk harrow, comprising a scraper blade for each disk, a shank extending upwardly from the blade, a movable scraper bar, a hanger member for connecting the shank and bar to support the blade in scraping or disengaged position with respect to the disk, said hanger member having supporting means releasably engaging the shank on the side remote from the disk for disengagement with the shank in response to movement of the scraper toward the disk, and the upper end of the shank being disposed to engage the scraper bar to prevent movement of the scraper with respect to the hanger member in the direction away from the disk.

10. Scraper mechanism for a disk harrow gang, comprising a scraper support, a scraper bar slidably mounted for movement lengthwise of the gang, scraper blades, means supporting the scraper blades from the bar for movement therewith as a unit from working engagement with the disks to idle positions away from the disks, a lever arranged for camming engagement with the scraper support for adjusting the scraper bar endwise, a lever mounting member on the scraper bar, and the said member having an upper portion for mounting the lever and said upper portion being inclined with respect to the bar to correspondingly angle the lever.

11. In a disk harrow gang structure having a series of disks, a bar supported for movement lengthwise of the gang, scraper mounting members on the bar, scrapers supported from the members for scraping engagement with the disks and movable collectively by adjustment of the bar from working relation with the disks to idle positions spaced from the disks, said mounting members and scrapers having cooperating means for releasably supporting the scrapers in operative scraping positions against the disks and restraining the scrapers from displacement by rotation of the disks, means normally limiting movement of the bar in one direction to said idle position, said limiting means being releasable to permit movement of the bar beyond said idle position whereby the scrapers may be swung toward the disks sufficiently to be removed from said releasable supporting means.

12. In a disk harrow gang structure having a series of disks, a scraper bar supported for movement lengthwise of the gang, mounting members on the bar, disk scrapers supported by the members and retained thereby from displacement in all directions except toward the disks, the position of the disks with respect to the mounting members being such as to restrain displacement movements of the scrapers in the direction toward the disks when the bar, mounting members and scrapers are in operative or normally idle positions, and means for releasing the bar to a position where the scrapers will be more removed from the respective disks than when in idle position so as to permit detachment of the scrapers by movement in the direction toward the disks.

13. A disk scraper device comprising a scraper and a mounting member therefor, said mounting member being movable to support the scraper in scraping position with respect to the surface of the disk, in an idle position spaced from such surface, and in a third position still further removed from the disk surface, releasable means connecting the mounting member and scraper and operative to hold the scraper toward the disk while also bracing the scraper against movement by frictional contact with the disk, the scraper being releasable from the mounting member by movement toward the disk when in said third mentioned position, the disk being operative, when the scraper is in the other two positions, to retain the scraper in non-releasable engagement with the mounting member.

14. A disk scraper device comprising a scraper and a mounting member therefor, said mounting member being movable to support the scraper in scraping position with respect to the surface of the disk, in an idle position spaced from such surface, and in a third position still further removed from the disk surface, releasable means connecting the mounting member and scraper and operative to hold the scraper toward the disk while also bracing the scraper against movement by frictional contact with the disk, the scraper being releasable from the mounting member by movement toward the disk when in said third mentioned position, the disk being operative, when the scraper is in the other two positions, to retain the scraper in non-releasable engagement with the mounting member, said releasable connecting means providing sufficient freedom for oscillating movement of the scraper so that the scraping edge of the scraper may conform itself to the engaged surface of the disk.

15. Cleaning mechanism for a gang of disks, comprising a bar disposed adjacent the gang, parallel therewith, and adjustable lengthwise, mounting members secured in spaced positions to the bar, one for each disk of the gang, scrapers carried by the mounting members and movable, by lengthwise adjustment of the bar into operative positions in contact with the disks, into inoperative positions spaced from the disks, and into third positions, still further from the disks, means releasably attaching the scrapers to their respective mounting members and operative to hold the scrapers toward the disks while also restraining the scrapers from movement by surface contact with the disks as the latter rotate, said attaching means providing freedom for lengthwise and tilting movement of the scrapers, when in said third mentioned positions, to permit removal and attachment of the scrapers by lengthwise and tilting movements thereof, and said disks being operative to limit said lengthwise and tilting movement of the scrapers, when the latter are in their operative and inoperative positions, to thereby prevent displacement of the scrapers when in said last mentioned positions.

JOHN P. SEAHOLM.